United States Patent Office 3,242,306
Patented Mar. 22, 1966

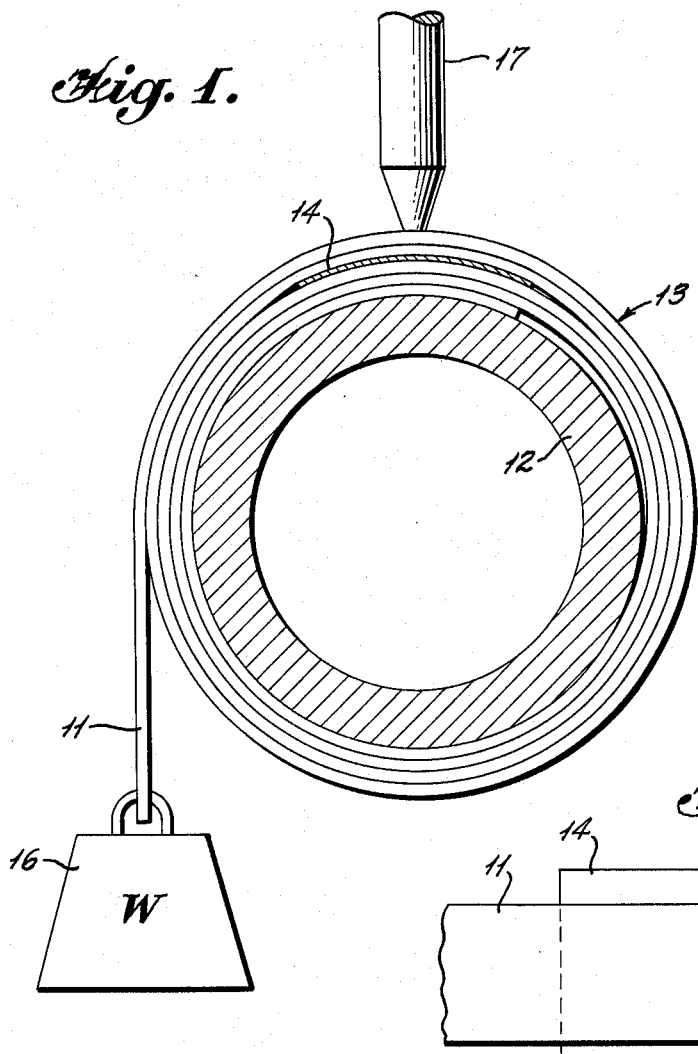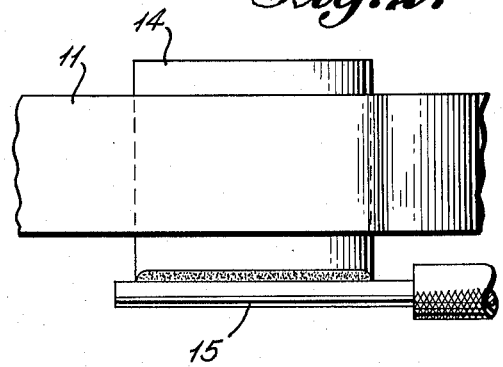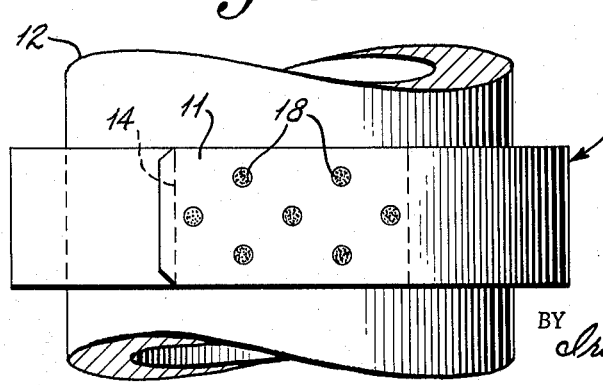

3,242,306
METHOD OF SPOT WELDING PRETENSIONED BANDING
James P. Dallas, 8511 Vicksbury, Los Angeles, Calif., and Pol R. Verbeke, 2004 Gates Ave., Redondo Beach, Calif.
Filed Jan. 30, 1964, Ser. No. 341,179
7 Claims. (Cl. 219—91)

This invention relates to a method of welding and, more particularly, to an improved method of spot welding pretensioned banding especially adapted to the manufacture of rotating electrical machines.

Pretensioned metal bands of high tensile strength material have found considerable use in industry for a variety of purposes. For example, they are often used to retain armature windings of high speed aircraft generators, motors, and other rotating electrical machines. Some types of automobile generators and starters use bandings to retain their windings. Such bandings are also used to increase the strength of hydraulic and pneumatic pressure vessels.

In a conventional method of manufacturing an armature, the windings are inserted in slots formed between the armature poles disposed around a central core. A strip of insulating material, such as hard fiber, is then inserted above the windings to assist in retaining the windings in the slots. Banding wire wrapped around the armature has then commonly been used to retain the armature windings in their slots. Such banding wire, however, has not proved entirely effective in that, it is not suitable for high temperature operation or for maximum r.p.m. conditions. The wire tends to sink into the insulation, thus reducing the effective thickness of the insulation. Metal ribbon banding consequently has been used in an effort to solve this problem of reducing the thickness of the insulation. The metal ribbon banding has less tendency to become embedded into the insulating due to the fact that the banding stresses are transmitted to the insulation from the whole surface of the band rather than being concentrated at the diameters of the banding wire.

A major problem in the use of metal ribbon banding, however, has been to fasten the banding while it is held at the required pretension. Heretofore, the end of the banding usually has been fastened by soldering or brazing. Such methods are cumbersome in that they require preliminary cleaning and fluxing of the joint to be fastened. Moreover, the joint grows in thickness due to the excess material which is added during the brazing or soldering operation, thus creating the problem of maintaining proper clearance where close tolerances are required. Often the brazing flash or excess solder must be ground off or filed. Soldered and brazed joints additionally cannot withstand high stresses and temperatures. A further disadvantage of soldered or brazed joints is that the heat necessary to form such joints damages any insulation underneath the banding.

Another problem in the use of metal ribbon banding for rotating electrical machines has been to provide such a banding having sufficient strength to resist the centrifugal forces created when the machines are rotated at high speeds. Heretofore, relatively thick banding has been used. The disadvantage of thick banding, however, is that it quickly builds up to an undesirable thickness. Consequently, it is often impossible to wrap such thick banding around the rotating machine a sufficient number of turns to obtain the strength necessary to adequately resist the centrifugal forces created when the machines are rotated at high speeds.

To overcome the foregoing disadvantages of the prior art, it is an object of the present invention to provide an improved method of fastening pretensioned banding while the banding is maintained under tension.

Another object of the invention is to provide a method of welding pretensioned banding which confines the heat generated to the immediate area of the weld, thereby eliminating the possibility of weakening or otherwise damaging any components of the apparatus being welded.

Still another object of the invention is to provide a method of welding pretensioned banding which produces a welded joint capable of withstanding high stresses and temperatures.

A further object of the invention is to provide a method of welding pretensioned banding which produces a compact welded joint without the addition of any welding material which may add to the thickness of the joint and thereby create clearance problems.

A still further object of the invention is to provide an improved method of manufacturing armatures and other rotating electrical machines which produces a machine capable of withstanding high stresses and temperatures.

The invention generally relates to a method of welding pretensioned banding which comprises winding a metal band into a plurality of turns to form a coil, placing a conductive metal foil electrode internal to said coil and beneath the outside turn to be welded, pretensioning the banding comprising said coil, applying an electrode to the outer surface of said outside turn in alignment with said foil electrode, and passing an electrical current between said electrodes while said banding is maintained under tension to effect a welding of said outside turn to the next preceding turn of said coil. The inner turns as well as the outer turns of the banding may be welded together by the use of this method. The invention is particularly suitable in the manufacture of rotating electrical machines.

The invention having been broadly described, it will now be discussed in detail with reference to the accompanying drawings in which:

FIGURE 1 is a side elevation view of a pretensioned banding wound around a core showing a metal foil electrode placed internal to the wound banding and a spot welding electrode applied to the outside turn of the banding in position to effect a spot weld;

FIGURE 2 is a top plan view illustrating the manner in which the foil electrode is connected to a welding circuit; and FIGURE 3 is a top plan view of a welded pretensioned banding showing a typical pattern of spot welds.

Illustrated in the drawings is a thin metal band 11 wound around a core or other object 12 a plurality of turns to form a coil 13. A typical use of such banding is in the construction of armatures of high speed generators, motors, and other rotating electrical machines wherein the banding is used to restrain the windings of the armature in the armature slots against the centrifugal force resulting from armature rotation. Such bandings are also used to increase the strength of hydraulic and pneumatic pressure vessels.

A highly conductive metal foil electrode 14, such as silver or copper foil, is placed internal to the coil 13 so formed so that it is beneath or inside the outermost or other turn of the coil to be welded. The metal foil 14 is inserted under the turns to be spot welded with at least one end projecting from under the banding for connection to one side of a spot welding circuit. As shown in FIGURE 2, a lead 15 connected to a welding current source is connected to one end of the foil electrode 14.

The banding 11 of coil 13 is pretensioned by any suitable means. In FIGURE 1, a weight 16 is shown attached to the free end of the banding 11 to effect the pretensioning.

A conventional spot welding electrode 17 connected to the welding current source is applied to the outer surface of the outside turn of the coil 13 to be welded. Spot welding electrode 17 is positioned above and in alignment with metal foil electrode 14 so that an electrical current may pass therebetween.

To effect a spot weld of pretensioned banding by means of the present invention, the thin metal band is first wrapped around the core a desired number of turns. The band initially may be fastened to the core by spot welding. The metal foil electrode is then inserted internal to the coil beneath or inside the turns to be welded. One end of the foil electrode is connected to one side of a welding circuit. The banding comprising the coil is then pretensioned by any suitable means, such as a weight. The spot welding electrode is connected to the other side of the welding circuit and applied to the outer surface of the outer turn of the coil to be welded. An electrical current is then passed between the electrodes at one or more spots 18 while the banding is maintained under tension to effect a spot welding of the turns of the coil between the electrodes. After the welding has been completed, all the projecting parts of the metal foil electrode may be trimmed away.

It is to be noted that the method of the present invention is readily adaptable to effect a welding of the inside or intermediate turns of the banding to adjacent turns as well as the outside turn of the banding. The present invention makes it conveniently possible, for example, to spot weld every turn of the banding to adjacent turns or to weld only certain of the intermediate turns to adjacent turns to obtain greater strength in the pretensioned banding. Thus, it is readily possible to effect any desired combination of multiple turn welding with the present invention. If desired, of course, only the end of the outside turn of the banding need be welded to the next preceding turn to fasten the banding.

The spot welding is effected by the heat generated as the electrical current passes through the members being welded between the electrodes. This method of spot welding confines the heat generated to the immediate area of the weld and avoids loss of temper adjacent the spot weld to a greater degree than other methods now used. Horeover, by confining the heat to the immediate area of the weld, any adjacent insulation or other material is not impaired. If the banding were being used to retain the windings of an armature, for example, the insulation between the windings and the banding would not be impaired by this method of welding.

The spot welding may be arranged in a pattern whereby the spots 18 are spaced in a predetermined distance, as shown in FIGURE 3, to minimize weakening the tensile strength of the band. For best results, the diameter of each of the spot welds preferably should be between 3 and 5 times the thickness of the banding being used. The diameter of each spot weld is determined by the diameter of the contact area of the tip of the spot welding electrode 17.

The metal foil electrode 15 which is inserted in the coil 13 should be slightly wider than the area of the spot weld is long and preferably is of a thickness of one-fourth to one-half of the thickness of the metal banding 11.

In a preferred form of the invention, the metal banding 11 is comprised of a thin, non-magnetic, high tensile strength material. One such material is Elgiloy, which is marketed by the Elgin National Watch Company. Elgiloy has excellent mechanical properties including an ultimate tensile strength, in the thickness to be used, approaching 300,000 pounds per square inch. Other banding materials, such as high carbon spring steel, also may be used.

Thin metal bands have been found to be more advantageous than relatively thicker bands. The thin bands develop a unit tensile strength as high as 50% greater than that obtainable from thicker sections of the same material. Moreover, the thin bands permit a sufficient amount of strength to be obtained from the banding without the build up of an undesirable thickness of the banding. This is particularly important when the banding is used to retain the windings of an armature.

A typical band might be made from a material which is .004" thick and .375" wide. Four to ten turns of the banding might be required with the pretension stress in the band between 100,000 to 150,000 pounds per square inch.

As previously stated, a typical use of pretensioned banding is in the manufacture of armatures wherein the banding is used to retain the armature windings against the centrifugal forces created when the armature is rotated at high speeds. When the pretensioned banding is on an armature, one or more grooves are provided around the outer diameter of the armature to receive the banding. A sufficient amount of pretensioning is placed on the banding to create a force which will exceed the maximum centrifugal force tending to expel the windings from the armature.

While the invention has been described with particular reference to preferred specific embodiments, many other modifications may be made by persons skilled in the art without departing from the scope of the invention which is defined solely by the appended claims.

We claim:
1. The method of spot welding pretensioned banding which comprises
   winding a thin metal band into a plurality of turns around a core to form a coil,
   placing a highly conductive metal foil electrode inside of the innermost turn of at least two adjacent turns of said coil with an end of said foil electrode projecting out from said coil for connection to one side of a welding circuit,
   pretensioning the banding comprising said coil,
   applying a spot welding electrode connected to the other side of said welding circuit to the outermost turn of said adjacent turns of said coil in alignment with said foil electrode, and
   passing an electrical current between said electrodes at one or more spots while said banding is maintained under tension to generate heat confined to the immediate area of said spot or spots sufficient to effect a spot welding of said adjacent turns.

2. A method of spot welding as defined in claim 1 wherein said metal band is comprised of a non-magnetic high tensile strength material.

3. A method of spot welding as defined in claim 1 wherein said foil electrode is of a thickness of one-fourth to one-half the thickness of said metal band.

4. The method of spot welding as defined in claim 1 wherein said foil electrode is comprised of silver.

5. The method of spot welding as defined in claim 1 wherein said foil electrode is comprised of copper.

6. The method of spot welding as defined in claim 1 wherein each of said spot welds has a diameter of from 3 to 5 times the thickness of said metal band.

7. The method of manufacturing a rotating electrical member which comprises
   wrapping a thin metal band around said member a sufficient number of turns to provide adequate protection against the centrifugal forces created when said member is rotated at high speeds,
   placing a conductive metal foil electrode inside of the innermost turn of at least two adjacent turns of said banding,
pretensioning said banding,
applying a spot welding electrode to the outer surface of the outermost turn of said adjacent turns of said banding in alignment with said foil electrode,
and passing an electrical current between said foil electrode and said spot welding electrode while said banding is maintained under tension to effect a welding of said turns between said electrodes.

References Cited by the Examiner

UNITED STATES PATENTS

| | | | |
|---|---|---|---|
| 1,305,503 | 6/1919 | Thomson | 219—91 |
| 2,078,006 | 4/1937 | Lockwood | 219—81 |
| 2,163,590 | 6/1939 | Ganahl et al. | 219—82 |
| 2,269,726 | 1/1942 | Martin | 219—89 |
| 2,394,822 | 2/1946 | Teplitz | 219—86 |

RICHARD M. WOOD, *Primary Examiner.*